Dec. 27, 1932.  S. D. SPRONG  1,891,959
TRANSFORMER
Filed April 14, 1932

Inventor:
Severn D. Sprong
by Charles E. Tullar
His Attorney.

Patented Dec. 27, 1932

1,891,959

UNITED STATES PATENT OFFICE

SEVERN D. SPRONG, OF BROOKLYN, NEW YORK, ASSIGNOR TO GENERAL ELECTRIC COMPANY, A CORPORATION OF NEW YORK

TRANSFORMER

Application filed April 14, 1932. Serial No. 605,247.

My invention relates to transformers and more particularly to transformers installed under the surface of the ground. In many places, such as in congested and residential sections of cities and towns, the use of poles and overhead conductors and transformers for distributing electric power has been avoided by placing the conductors and transformers underground. This improves the appearance above ground and protects the transformers from the effects of wind and lightning. However, the dissipation of heat from an underground transformer is not so readily cared for and the space available underground is often restricted, particularly under congested city streets, so that compactness is desirable.

The general object of the invention is to provide an improved underground transformer arrangement which is compact and well adapted for efficient dissipation of heat from the transformer. A further object is to provide an underground transformer arrangement wherein the transformer may be easily and conveniently removed or replaced.

Figure 1:
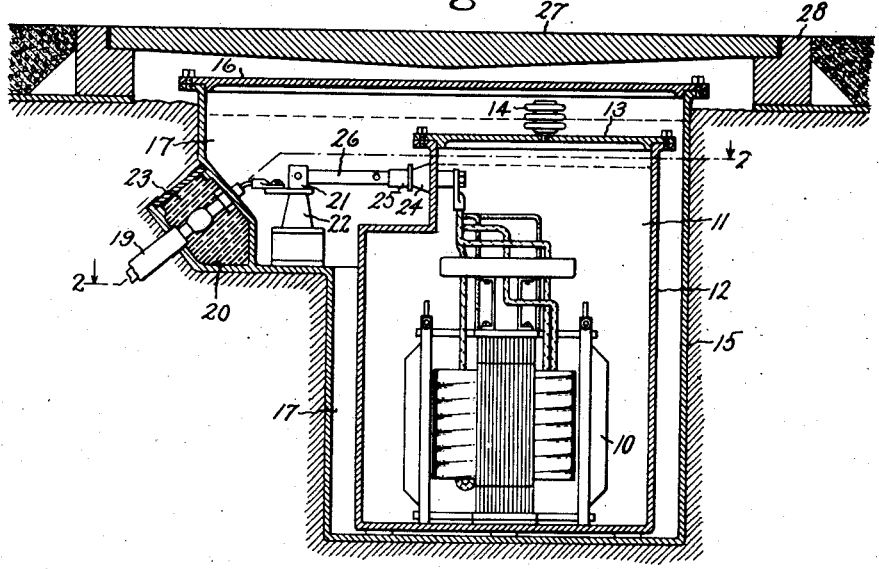
Figure 2:
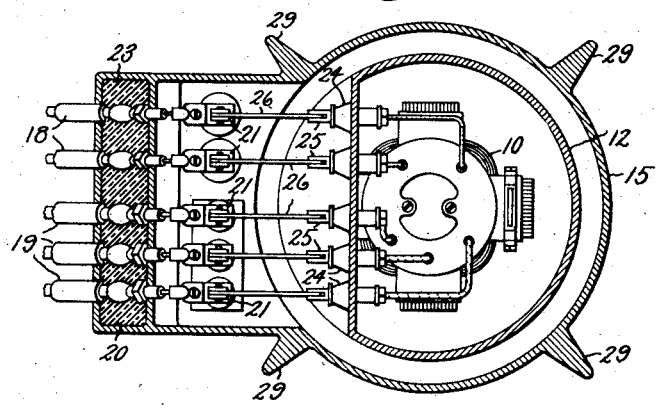

These and other objects and advantages will be explained in the following description taken in connection with the accompanying drawing in which Fig. 1 is a vertical sectional view of an underground transformer arranged in accordance with the invention, and Fig. 2 is a sectional view on the line 2—2 of Fig. 1.

Like reference characters indicate similar parts in both figures of the drawing.

The transformer 10 shown in the drawing is immersed in a body of insulating and cooling liquid 11 in a metal casing 12 which is sealed by a tightly fitting cover 13. A sealed expansible compartment 14 communicates with the transformer casing 12 to permit thermal expansion and contraction of the liquid 11 without excessive variation of pressure.

The transformer casing 12 is disposed in an outer metal casing 15 which is buried in the ground with which its sides and bottom are in intimate contact. This casing 15 is sealed by a tightly fitting cover 16 which is close to the level of the ground. The outer casing 15 contains a body of insulating and cooling liquid 17 which surrounds the inner casing 12 and preferably extends to a level somewhat above the cover 13 of the inner casing.

The primary side of the transformer 10 is connected to two underground cables 18 and the secondary side of the transformer to three underground cables 19. The cables 18 and 19 extend through a compartment 20 integral with the side of the outer casing 15 and are connected to switch terminals 21 supported inside this casing on insulators 22 secured to the casing wall. The compartment 20 is filled with a suitable insulating and waterproof compound 23 to seal the openings through which the cables enter the casing 15 against leakage of moisture into the casing. The transformer leads are extended through the wall of the casing 12 in bushings 24 and are connected to switch terminals 25 on the outer ends of these bushings. These terminals 25 are formed to receive the outer ends of movable switch blades 26 pivoted to the terminals 21. In many places, such as under the surfaces of city streets, a strong protecting cover 27 will be desirable above the cover 16 of the outer casing 15 and supported on a suitable frame 28 resting on the ground around the top of the outer casing 15.

The connections between the cables and the transformer require little space and the outer casing 15 need be only little longer than the inner casing 12 which encloses the transformer so that the complete assembly may be very compact. This is often of decided advantage, particularly where the space underground is congested as is frequently the case under city streets. The transformer may be very easily and conveniently removed and replaced without exposure to the outside air by simply removing the covers 27 and 16 and opening the switch blades 26. All parts are effectively protected by the outer casing 15 and its cover 16 and there is never any danger from moisture as often seems with the usual transformer manhole which is not water-tight. The connections between the cables and the transformer are everywhere effectively insulated by the insulating liquid in which they are immersed. There is good heat conductivity downwardly and on all sides from the transformer into the surrounding earth and this may be increased, if desired, by providing external integral projections or ribs 29 on the outer casing.

The invention and some of its advantages have been explained by describing and illustrating a particular embodiment thereof but it will be obvious that changes may be made without departing from the spirit of the invention and the scope of the appended claims.

What I claim as new and desire to secure by Letters Patent of the United States, is,—

1. The combination with an outer sealed metal casing arranged at least partly underground with its bottom and sides in contact with the surrounding earth, insulating liquid within said casing, an inner metal casing immersed in the liquid within said outer casing, insulating liquid within said inner casing, a transformer immersed in the liquid within said inner casing, underground cables extending into said outer casing, and connections between said cables and said transformer.

2. The combination with an outer sealed metal casing arranged at least partly underground with its bottom and sides in contact with the surrounding earth, insulating liquid within said casing, an inner metal casing immersed in the liquid within said outer casing, insulating liquid within said inner casing, a transformer immersed in the liquid within said inner casing, underground cables extending into said outer casing, and means including connections immersed in said liquid within the outer casing connecting said cables and transformer.

3. The combination with an outer sealed metal casing arranged at least partly underground with its bottom and sides in contact with the surrounding earth, insulating liquid within said casing, an inner metal casing immersed in the liquid within said outer casing, insulating liquid within said inner casing, a transformer immersed in the liquid within said inner casing, a compartment on the side of said outer casing, sealing compound in said compartment, underground cables extending through said compartment into said outer casing, and connections between said cables and said transformer.

4. The combination with an outer sealed metal casing arranged at least partly underground with its bottom and sides in contact with the surrounding earth, insulating liquid within said casing, an inner metal casing immersed in the liquid within said outer casing, insulating liquid within said inner casing, a transformer immersed in the liquid within said inner casing, underground cables extending into said outer casing, and switching means immersed in said liquid within the outer casing for connecting said cables and said transformer.

5. The combination with an outer sealed metal casing arranged at least partly underground with its bottom and sides in contact with the surrounding earth, insulating liquid within said casing, an inner metal casing immersed in the liquid within said outer casing, insulating liquid within said inner casing, a transformer immersed in the liquid within said inner casing, underground cables extending into said outer casing, switch terminals mounted on said outer casing and connected to said cables, switch terminals mounted on said inner casing and connected to said transformer, and means for connecting said terminals.

6. The combination with an outer sealed metal casing arranged at least partly underground with its bottom and sides in contact with the surrounding earth, insulating liquid within said casing, an inner metal casing immersed in the liquid within said outer casing, insulating liquid within said inner casing, a transformer immersed in the liquid within said inner casing, underground cables extending into said outer casing, switch terminals mounted on said outer casing and connected to said cables, switch terminals mounted on said inner casing and connected to said transformer, and means for connecting said terminals, said terminals and connecting means being immersed in said liquid within the outer casing.

7. The combination with an outer sealed metal casing arranged at least partly underground with its bottom and sides in contact with the surrounding earth, insulating liquid within said casing, an inner metal casing immersed in the liquid within said outer casing, insulating liquid within said inner casing, a transformer immersed in the liquid within said inner casing, underground cables extending into said outer casing, connections between said cables and said transformer, a protective cover above said outer casing, and a support for said cover resting on the ground around said outer casing.

In witness whereof, I have hereunto set my hand.

SEVERN D. SPRONG.